US008842947B2

(12) United States Patent
Jiang et al.

(10) Patent No.: US 8,842,947 B2
(45) Date of Patent: Sep. 23, 2014

(54) METHOD AND APPARATUS FOR COLORLESS ADD

(75) Inventors: Zhiping Jiang, Kanata (CA); Jian Zhong, Kanata (CA); Yan Cui, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 244 days.

(21) Appl. No.: 13/292,564

(22) Filed: Nov. 9, 2011

(65) Prior Publication Data

US 2012/0308179 A1 Dec. 6, 2012

Related U.S. Application Data

(60) Provisional application No. 61/493,150, filed on Jun. 3, 2011.

(51) Int. Cl.
*G02B 6/26* (2006.01)
*H04J 14/02* (2006.01)

(52) U.S. Cl.
CPC ......... *H04J 14/0212* (2013.01); *H04J 14/0208* (2013.01); *H04J 14/0221* (2013.01)
USPC .......................................... 385/16

(58) Field of Classification Search
None
See application file for complete search history.

(56) References Cited

U.S. PATENT DOCUMENTS

| | | | |
|---|---|---|---|
| 6,335,830 B1 | 1/2002 | Chang et al. | |
| 6,456,752 B1 | 9/2002 | Dragone | |
| 6,922,277 B2 * | 7/2005 | Moon et al. | 359/298 |
| 7,206,466 B2 | 4/2007 | He et al. | |
| 7,469,080 B2 * | 12/2008 | Strasser et al. | 385/17 |
| 7,983,560 B2 * | 7/2011 | Maki et al. | 398/50 |
| 8,401,348 B2 * | 3/2013 | Boduch | 385/16 |
| 2003/0002104 A1 * | 1/2003 | Caroli et al. | 359/127 |
| 2005/0013615 A1 * | 1/2005 | Matsuda | 398/83 |
| 2008/0279556 A1 | 11/2008 | Yu et al. | |
| 2009/0041457 A1 | 2/2009 | Maki et al. | |

(Continued)

FOREIGN PATENT DOCUMENTS

| | | |
|---|---|---|
| CN | 1348270 A | 5/2002 |
| CN | 1548995 A | 11/2004 |

OTHER PUBLICATIONS

"Tunable Demux Offers Colorless Demultiplexing in ROADM Networks," http://news.thomasnet.com/fullstory/Tunable-Demux-offers-colorless-demultiplexing-in-ROADM-networks-592196, downloaded May 27, 2011, 3 pages.

(Continued)

*Primary Examiner* — Sung Pak
(74) *Attorney, Agent, or Firm* — Conley Rose, P.C.; Grant Rodolph; Brandt D. Howell

(57) ABSTRACT

An apparatus comprising a plurality of switches coupled to a plurality of corresponding colorless laser transmitters, an odd channel coupler coupled to each of the switches, an even channel coupler coupled to each of the switches, and an interleaver coupled to the odd channel coupler and the even channel coupler. Also disclosed is an apparatus comprising a coupler coupled to a plurality of colorless laser transmitters, a first interleaver coupled to the coupler, and a second interleaver coupled to the first interleaver. Also disclosed is an apparatus comprising an odd channel coupler coupled to a plurality of first laser transmitters, an even channel coupler coupled to a plurality of second laser transmitters, and an interleaver coupled to the odd channel coupler and the even channel coupler.

17 Claims, 9 Drawing Sheets

(56) References Cited

U.S. PATENT DOCUMENTS

| | | |
|---|---|---|
| 2009/0220242 A1* | 9/2009 | Ooi et al. .................. 398/85 |
| 2009/0226168 A1 | 9/2009 | Boduch |
| 2010/0202778 A1 | 8/2010 | Wisseman |
| 2011/0052201 A1 | 3/2011 | Ji et al. |
| 2011/0262143 A1* | 10/2011 | Ji et al. .................. 398/83 |
| 2012/0051750 A1* | 3/2012 | Yano .................. 398/91 |
| 2013/0223794 A1* | 8/2013 | Boduch .................. 385/24 |

OTHER PUBLICATIONS

Foreign Communications From A Counterpart Application, PCT Application PCT/CN2012/076419, International Search Report dated Oct. 18, 2012, 6 pages.

Foreign Communication From A Counterpart Application, PCT Application PCT/CN2012/076419, Written Opinion dated Oct. 18, 2012, 5 pages.

Thomas Publishing Co., "Tunable Demux Offers Colorless Demultiplexing in Roadm Networks," http://news.thomasnet.com/fullstory/Tunable-Demux-offers-colorless-demultiplexing-in-ROADM-networks-592196, dated Mar. 2, 2011.

Foreign Communication From a Counterpart Application, European Application No. 12793209.3, Extended European Search Report dated Jul. 21, 2014, 8 pages.

\* cited by examiner

METHOD AND APPARATUS FOR COLORLESS ADD

CROSS-REFERENCE TO RELATED APPLICATIONS

The present application claims the benefit of U.S. Provisional Patent Application No. 61/493,150 filed Jun. 3, 2011 by Zhiping Jiang et al. and entitled "Method and Apparatus for Colorless Add," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical transmission systems constitute the basic carrier for most telecommunication systems. Many optical transmission technologies are based on the principle of wavelength division multiplexing (WDM) or Dense WDM (DWDM), where the transmission channels are carried by optical signals over different wavelengths or different bands of wavelengths. In some WDM or DWDM systems, it is desirable to use a colorless add architecture that can be combined with a plurality of similar or identical laser transmitters to provide a plurality of different wavelength channels. The colorless add architecture may comprise a plurality of filters that have different band-pass spectra that select different wavelength bands from the same or similar laser transmitters to provide the different wavelength channels. The colorless add architecture may be advantageous since one type of laser transmitters may be needed to provide all the wavelength channels, which may reduce inventory requirements and total cost of the system.

SUMMARY

In one embodiment, the disclosure includes an apparatus comprising a plurality of switches coupled to a plurality of corresponding colorless laser transmitters, an odd channel coupler coupled to each of the switches, an even channel coupler coupled to each of the switches, and an interleaver coupled to the odd channel coupler and the even channel coupler.

In another embodiment, the disclosure includes an apparatus comprising a coupler coupled to a plurality of colorless laser transmitters, a first interleaver coupled to the coupler, and a second interleaver coupled to the first interleaver.

In another embodiment, the disclosure includes an apparatus comprising an odd channel coupler coupled to a plurality of first laser transmitters, an even channel coupler coupled to a plurality of second laser transmitters, and an interleaver coupled to the odd channel coupler and the even channel coupler.

In another embodiment, the disclosure includes an apparatus comprising a plurality of switches coupled to a plurality of corresponding colorless laser transmitters, an odd channel coupler coupled to each of the switches, an even channel coupler coupled to each of the switches, and a wavelength selective switch (WSS) coupled to the odd channel coupler and the even channel coupler.

In yet another embodiment, the disclosure includes a method implemented using an colorless add apparatus comprising receiving an integer N of channels via N corresponding switches, splitting the N channels into 2N channels at the switches, forwarding from the switches N channels to an odd channel coupler and N channels to an even channel coupler, select and combining N odd channels at the odd channel coupler, selecting and combining N even channels at the even channel coupler, forwarding the N odd channels from the odd channel coupler to an interleaver, forwarding the N even channels from the even channel coupler to the interleaver, and interleave the N odd channels and the N even channels at the interleaver into 2N channels, and forwarding the 2N channels.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Current colorless add architectures include using couplers or tunable filters, such as a WSS. However, both colorless add architectures based on couplers and colorless add architectures based on tunable filters or WSS suffer from undesirable characteristics. The coupler based colorless add architecture typically suffers from crosstalk (e.g., linear crosstalk)

between the neighboring wavelength channels, such as when the wavelength channel width is comparable to the channel spacing. The coupler may not completely or sufficiently block all wavelengths or signals outside a wavelength channel, and the non-blocked wavelengths may cross into another adjacent wavelength channel and thus cause noise in the adjacent wavelength channel. The tunable filter or WSS based colorless add architecture typically has better signal isolation between the wavelength channels and hence better signal to noise ratio (SNR) than the coupler based colorless add architecture, due to the improved spectral selection characteristic of the WSS in comparison to the coupler. However, the WSS based colorless add architecture typically has higher cost than the coupler based colorless add architecture due to the higher cost of WSS.

Disclosed herein are systems and methods for implementing an improved colorless add architecture, which may be used in WDM or DWDM based communications systems. The improved colorless add architecture may be an interleaver based colorless add architecture that may have less crosstalk and higher SNR than the coupler based colorless add architecture and lower cost than the tunable filter/WSS based colorless add architecture. A plurality of interleaver based colorless add architectures may be used, which may comprise different combinations of interleavers, couplers, and optical switches. The optical switches may be configured to direct a plurality of wavelength channels to an odd wavelength set coupler and an even wavelength set coupler. The odd and even wavelength channels from the couplers may then be combined via one or more interleavers. As such, the crosstalk (e.g., linear crosstalk) from the coupler(s) may be eliminated by the interleaver(s). The interleaver based colorless add architecture may also be implemented using PLC technology, which may further reduce cost and size.

Figure 1:
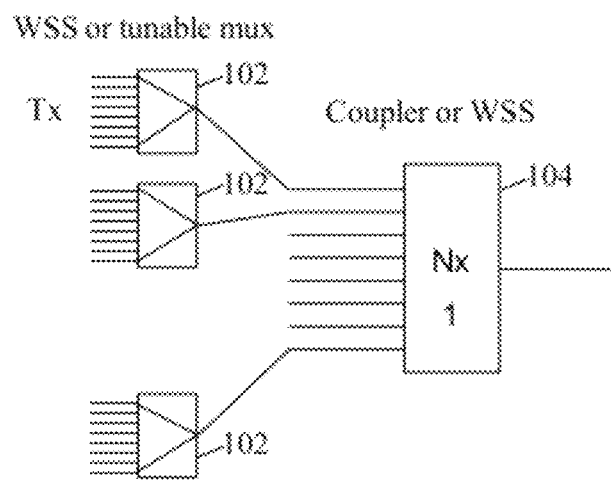
FIG. 1 is a schematic diagram of an embodiment of a wavelength selective switch/tunable filter based colorless add architecture.

FIG. 1 illustrates an embodiment of a WSS/tunable filter based colorless add architecture 100 that may be used in WDM or DWDM based communications systems. The WSS/tunable filter based colorless add 100 may comprise a plurality of WSS, or tunable filters 102, which may be coupled to a second WSS or coupler 104. The couplers may also be referred to herein as multiplexers (mux) and the two terms may be used interchangeably. Each of the WSS/tunable mux 102 may be coupled to a set of optical or laser transmitters (not shown) that may be similar or identical. Such similar or identical transmitters may have the same optical characteristics (e.g., total optical bandwidth) and may be referred to as colorless laser transmitters. The WSS/tunable mux 102 filters may select (by filtering) different wavelength channels from the similar outputs or signals from the laser transmitters, and forward the wavelength channels to the second WSS or coupler 104. Each WSS/tunable mux 102 may send about X wavelength channels (X is an integer) from about X corresponding laser transmitters to the second WSS/coupler 104. For instance, in one embodiment, each 9 port WSS/tunable mux 102 may provide a maximum of 9 wavelength channels to the second WSS/coupler 104. Note that the methods, systems, and apparatuses of the present invention are not limited to WSS/tunable muxes with 9 ports, but may be implemented with WSS/tunable muxes with other numbers of ports, as well.

The second WSS or coupler 104 may be configured to receive about X wavelength channels from each one of about N WSS/tunable mux 102 (N is an integer) and combine all the wavelength channels into a single fiber at the output. The WSS/tunable filter based colorless add architecture 100 may use a N×1 coupler to combine the wavelength channels at reduced system cost or may use a N×1 second WSS to combine the wavelength channels at improved SNRs and reduced crosstalk in the wavelength channels. However, the overall cost of the system may remain relatively high using either configuration. The system may also have a relatively large footprint (occupy substantial space or area) using either configuration.

Figure 2:
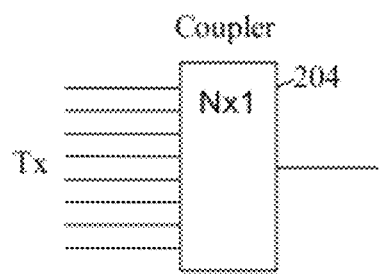
FIG. 2 is a schematic diagram of an embodiment of a coupler based colorless add architecture.
Figure 2:
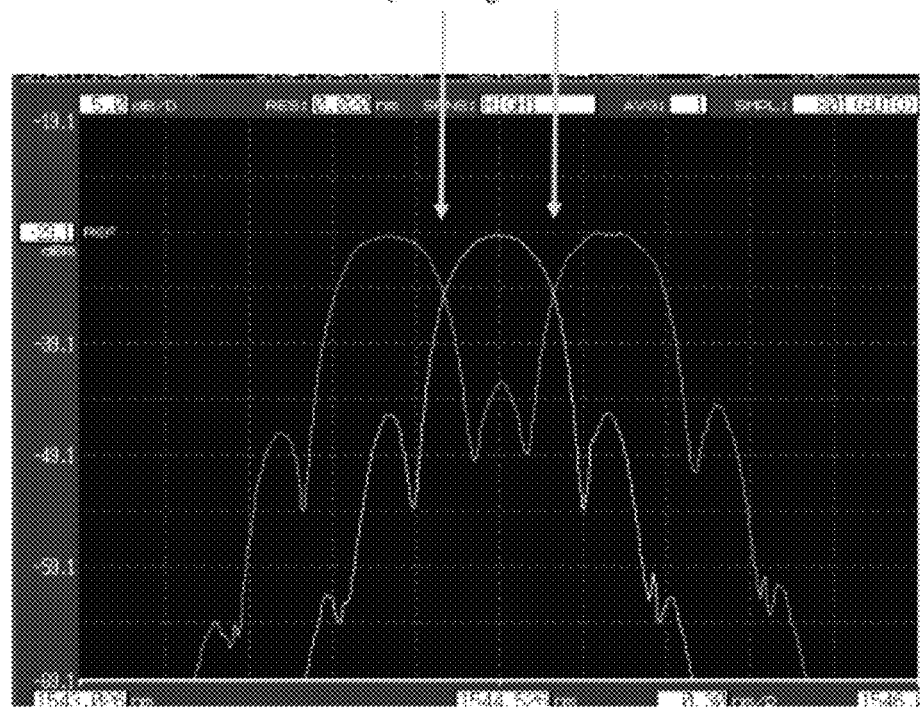

FIG. 2 illustrates an embodiment of a coupler based colorless add architecture 200 that may be used in WDM or DWDM based communications systems. The coupler based colorless add 200 may comprise a coupler (or a mux) 204 that may be coupled to a plurality of colorless laser transmitters (not shown). The coupler 204 may connect different wavelength channels from the colorless laser transmitters, and combine and forward the wavelength channels into a single output fiber. In other configurations, the coupler based colorless add architecture 200 may comprise a plurality of cascaded couplers 204, e.g., to provide more wavelength channels.

The coupler based colorless add architecture 200 may be a relatively low cost scheme for implementing colorless add. However, due to the lack of spectral filtering, the coupler based colorless add architecture 200 may have relatively high linear crosstalk and hence relatively low SNR (in the wavelength channels), which may not be suitable or may be limiting in some scenarios. The crosstalk effect on wavelength channel characteristics is also shown in FIG. 2. Specifically, two adjacent wavelength channels are shown (around 1544.526 nanometer (nm) wavelength) with substantial overlap. This overlap is referred to as linear crosstalk and may result in reduced SNR in the wavelength channels. The wavelength channels and crosstalk is shown for the case of 100 Gigabit (G) Polarization-Division Multiplexing (PDM)-quadrature phase-shift keying (QPSK) signals. The linear crosstalk in this case may correspond to an about 2 decibel (dB) optical SNR (OSNR) penalty. Similar linear crosstalk and OSNR penalty may be found in 40 G differential QPSK (DQPSK) signals and 50 Gigahertz (GHz) spacing systems.

Figure 3:
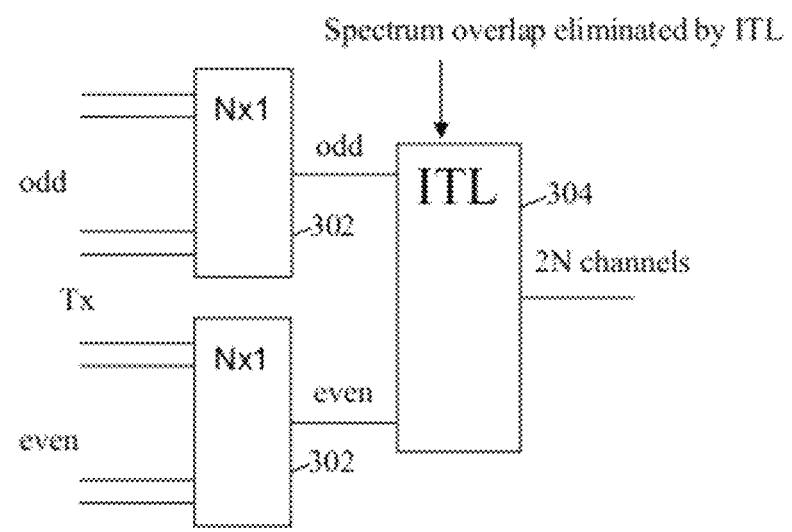
FIG. 3 is a schematic diagram of an embodiment of an interleaver based colorless add architecture.

FIG. 3 illustrates an embodiment of an interleaver based colorless add architecture 300 that may be used in WDM or DWDM based communications systems. The interleaver based colorless add architecture 300 may comprise about two couplers 302 coupled to an interleaver (ITL) 304. Each of the two couplers 302 may be coupled to a set of N laser transmitters (not shown) that may be similar. Specifically one of the couplers 302 may be configured to connect a plurality of N odd wavelength channels from the laser transmitters, and combine and forward the odd wavelength channels to the ITL 304. The other coupler 302 may be configured to connect a plurality of N even wavelength channels, and combine and forward the even wavelength channels to the ITL 304. The ITL 304 may be configured to interleave the odd wavelength channels and the even wavelength channels to provide a plurality of 2N (WDM or DWDM) wavelength channels at a combined output (fiber). The ITL 304 may also eliminate or substantially reduce channel overlap between the wavelength channels.

Generating the odd wavelength channels and the even wavelength channels separately by two separate couplers 302 and then interleaving the even and odd channels by the ITL 304 may guarantee sufficient spectrum filtering with respect to channel width and hence reduce linear crosstalk and the OSNR in the wavelength channels. The interleaver based colorless add architecture 300 may have lower crosstalk and better OSNR than the coupler based colorless add architecture 200. The interleaver based colorless add architecture 300 may also have lower cost than the WSS/tunable filter based colorless add architecture 100. However, the odd and even channel couplers 302 may be coupled to two separate sets of laser transmitters, and thus the interleaver based colorless add architecture 300 may not be a true or complete colorless add scheme.

Figure 4:
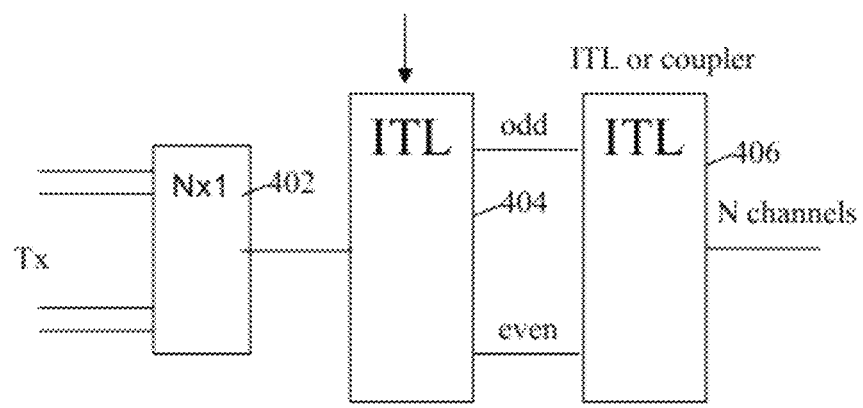
FIG. 4 is a schematic diagram of another embodiment of an interleaver based colorless add architecture.

FIG. 4 illustrates an embodiment of another interleaver based colorless add architecture 400 that may be used in WDM or DWDM based communications systems. The interleaver based colorless add architecture 400 may comprise a coupler 402 coupled by a single output to a first ITL 404. The first ITL 404 may be coupled via two outputs, separating odd and even wavelength channels, to a second ITL 406. The components of the interleaver based colorless add architecture 400 may be arranged as shown in FIG. 4. The coupler 402 may be coupled to a set of colorless laser transmitters (not shown). The coupler 402 may be configured to connect a plurality of N wavelength channels from the laser transmitters, and combine and forward the wavelength channels to the first ITL 404. The first ITL 404 may be configured to de-interleave the wavelength channels into two sets of wavelength channels: a set of about N/2 odd wavelength channels and a set of about N/2 even wavelength channels. As such, the first ITL 404 may operate in a reverse manner to the ITL 304. The sets of even and odd wavelength channels may then be forwarded to the second ITL 406, which may interleave the two sets, e.g., in a manner similar to the to the ITL 304, and combine N wavelength channels at the output (fiber).

The interleaver based colorless add architecture 400 may be a true colorless add configuration that uses colorless laser transmitters that are coupled to the same coupler 402. The interleaver based colorless add architecture 400 may also have lower cost than the WSS/tunable filter based colorless add architecture 100 and lower crosstalk than the coupler based colorless add architecture 200. However, the interleaver based colorless add architecture 400 may have higher linear crosstalk, and hence higher OSNR penalty, than the interleaver based colorless add architecture 300 since the spectrum overlap occurs after coupler 402 and before ITL 404 and therefore may not be completely eliminated by ITL 404.

Figure 5:
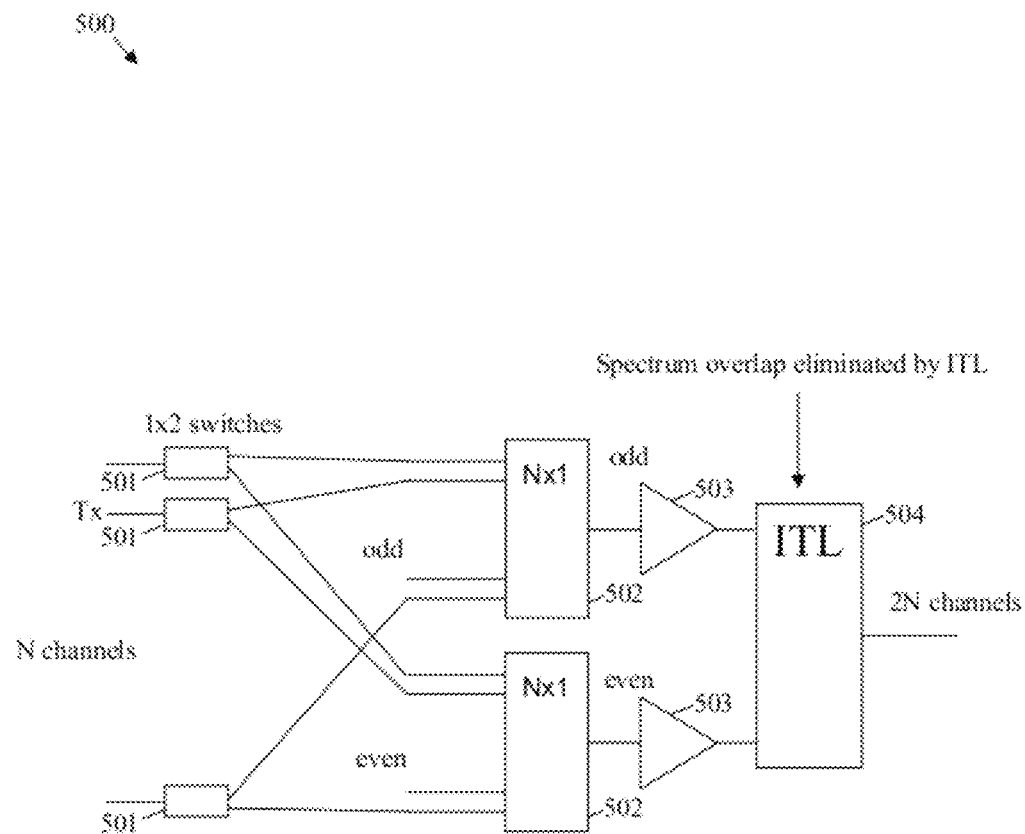
FIG. 5 is a schematic diagram of another embodiment of an interleaver based colorless add architecture.

FIG. 5 illustrates an embodiment of another interleaver based colorless add architecture 500 that may be used in WDM or DWDM based communications systems. The interleaver based colorless add architecture 500 may comprise a plurality of switches 501, which may be each coupled (at an import port) to a laser transmitter (not shown) and to about two couplers 502 (at two corresponding output ports). The two couplers 502 may comprise an odd channel coupler and an even channel coupler, which may be both coupled to an ITL 504. In some embodiments, the interleaver based colorless add architecture 500 may also comprise about two amplifiers 503, each positioned between one corresponding coupler 503 and the ITL 504.

Each switch 502 may be a 1×2 switch configured to send the same output from a corresponding laser transmitter to both the even and odd channel couplers 502. The odd channel coupler 502 may be configured to connect a plurality of N odd wavelength channels from the laser transmitters, and combine and forward the odd wavelength channels to the ITL 504. The other coupler 502 may be configured to connect a plurality of N even wavelength channels, and combine and forward the even wavelength channels to the ITL 504. The ITL 504 may be configured to interleave the odd wavelength channels and the even wavelength channels to provide a plurality of 2N (WDM or DWDM) wavelength channels at a combined output (fiber). The ITL 504 may also eliminate or substantially reduce channel overlap and hence crosstalk between the wavelength channels. In some embodiments, the signals in each of the sets of odd and even wavelength channels may be amplified by a corresponding amplifier 503 before being forwarded to the ITL 504. For instance, the amplifiers 503 may be Erbium Doped Fiber Amplifier (EDFA) amplifiers, but other types of optical amplifiers may also be used.

The interleaver based colorless add architecture 500 may be a true colorless add configuration that uses the colorless laser transmitters, which may be coupled to the corresponding switches 501, with both even and odd channel couplers 502. The interleaver based colorless add architecture 500 may also have lower cost than the WSS/tunable filter based colorless add architecture 100 and lower crosstalk than the coupler based colorless add architecture 200. Generating the odd wavelength channels and the even wavelength channels separately by two separate couplers 502 and then interleaving the odd and even channels by the ITL 504 may also guarantee sufficient spectrum filtering and hence reduce linear crosstalk and OSNR in the wavelength channels. The interleaver based colorless add architecture 500 may have lower crosstalk and better OSNR than the interleaver based colorless add architecture 400 but may have higher cost.

Figure 6:
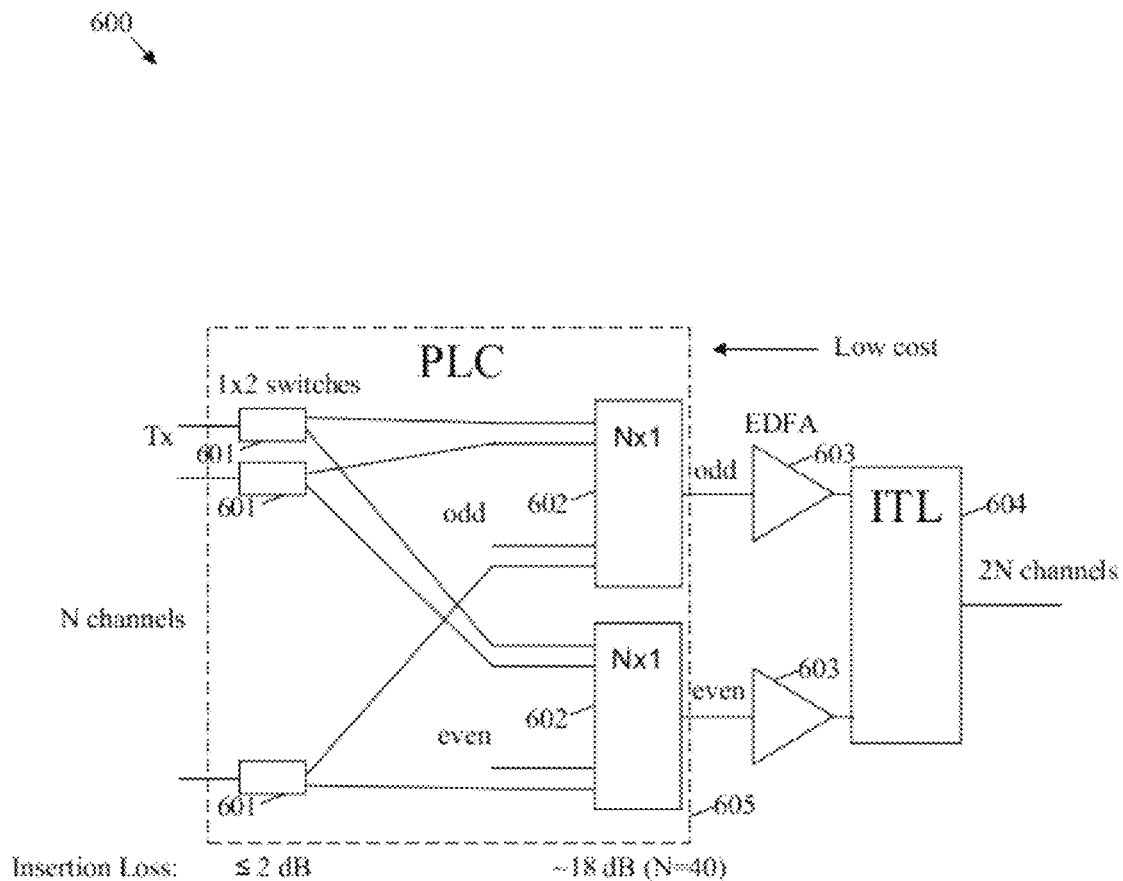
FIG. 6 is a schematic diagram of an embodiment of an interleaver and planar-lightwave circuit (PLC) based colorless add architecture.

FIG. 6 illustrates an embodiment of an interleaver and PLC based colorless add architecture 600 that may be used in WDM or DWDM based communications systems. The interleaver and PLC based colorless add architecture 600 may comprise a plurality of switches 601, about two couplers 602, an ITL 604, and possibly about two amplifiers 603. The components of interleaver and PLC based colorless add architecture 600 may be configured and arranged similar to the components of the interleaver based colorless add architecture 500. However, at least some of the components of the interleaver and PLC based colorless add architecture 600, such as the switches 601 and the couplers 602, may be integrated or positioned on a PLC 605 (e.g., on a board or card). Thus, the system may have the same advantages as the interleaver based colorless add architecture 500.

Further, the integration of the components in the interleaver based colorless add architecture 600 may reduce system cost, integration complexity, footprint, or combinations thereof. The integration of such components on the PLC 605 may be achievable where the isolation requirements for the switches 601 and/or the other components on the PLC 605 may be substantially low, e.g., up to about 20 dB. For instance, in the case of for a 100G PDM Return-to-Zero (RZ) QPSK signals, the linear crosstalk of the PLC 605 based system may correspond to about 1.3 dB OSNR penalty for equal power switching including about 0.013 dB for 20 dB isolation. The Multi-Path Interference (MPI) may be reduced by the ITL 604. The interleaver based colorless add architecture 600 may receive about N (e.g., 20) wavelength channels (via N switches 601), and provide 2N (e.g., 40) wavelength channels (via the ITL 604), e.g., about 20 odd and 20 even channels. The insertion loss at the N switches 601 may be less than or equal to about 2 dB. In the case of 20 input channels, and the insertion loss at the two even and odd channel couplers 602 may be about 18 dB. The location of the amplifiers 603 (e.g., EDFAs) may also vary in different embodiments. For instance, the amplifiers 603 may be integrated on the PLC 605, e.g., at the output ports of the couplers 602. In yet another embodiment, the ITL 604 may also be integrated on the PLC 605. In an embodiment, the ITL 604 may also be replaced by a WSS.

Figure 7:
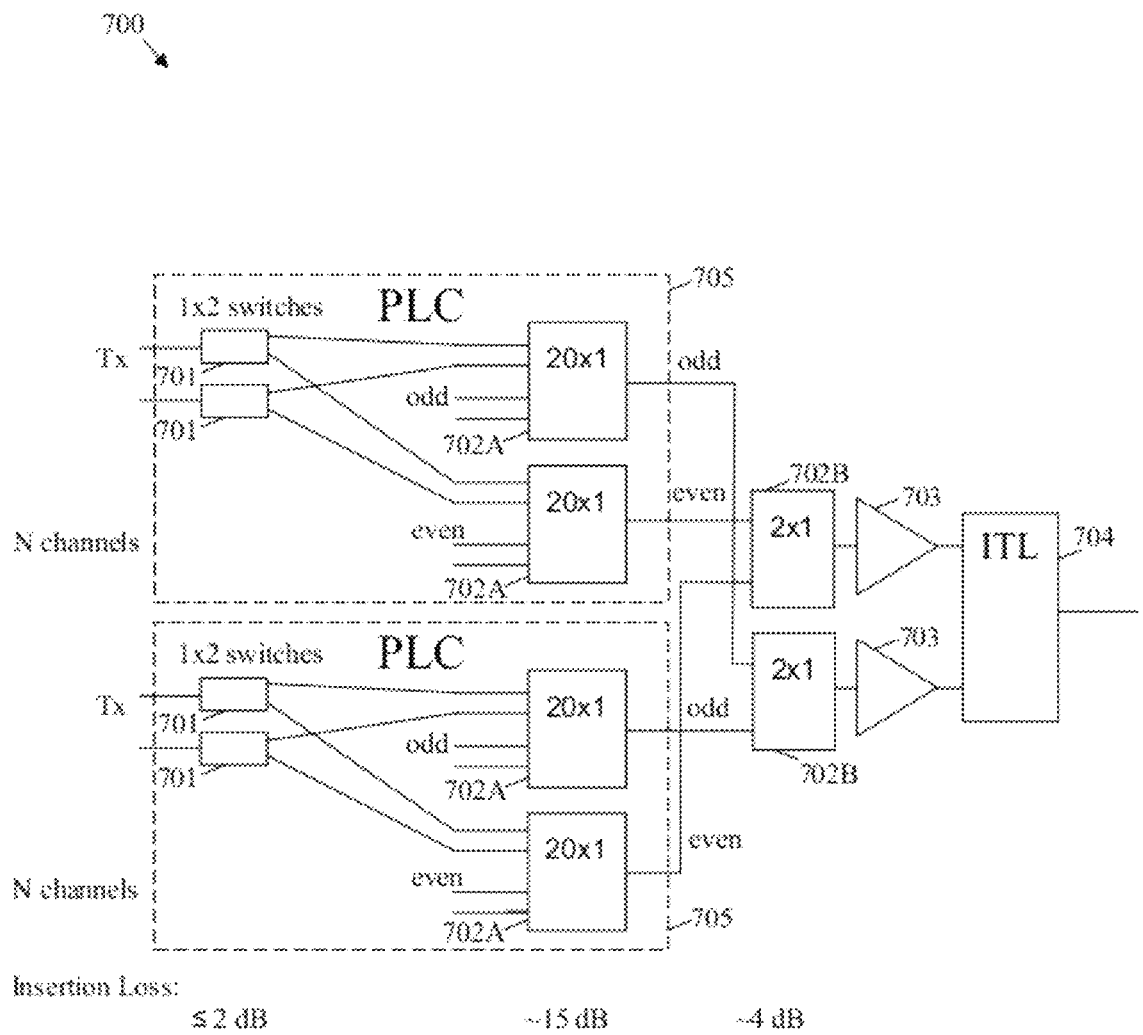
FIG. 7 is a schematic diagram of another embodiment of an interleaver and PLC based colorless add architecture.

FIG. 7 illustrates an embodiment of another interleaver and PLC based colorless add architecture 700 that may be used in WDM or DWDM based communications systems. The interleaver and PLC based colorless add architecture 700 may comprise a plurality of switches 701, about four first couplers 702A, about two second couplers or combiners 702B, an ITL 704, two PLCs 705, and possibly about two amplifiers 703, which may be arranged as shown in FIG. 7. Specifically, a first set of N (e.g., 20) switches 701 may be coupled to each of two of the first couplers 702A. Two of the first couplers 702A may comprise even and odd channel couplers (e.g., 20×1 couplers) and may be integrated with the N (e.g., 20) switches 701 on one of the two PLCs 705. As such, the two first couplers 702A may receive a total of 40 channels (20 odd and 20 even channels).

Similarly, a second set of N (e.g., 20) switches 701 may be coupled to each of two other first couplers 702A. The two other first couplers 705 may also comprise even and odd channel couplers (e.g., 20×1 couplers) and may be integrated with the N (e.g., 20) switches 701 on the other PLC 705. The two even channel couplers 702A in the two PLCs 705 may be coupled to one of the two second couplers or combiners 702B (2×1 coupler), which may be outside the PLCs 705. The two odd channel couplers 705 in the two PLCs 705 may be coupled to the remaining second coupler 702 (e.g., 20×1 couplers), which may also be outside the PLCs 705. The two second couplers or combiners 702B may also be coupled to the ITL 704. The two amplifiers 703 may be each positioned between one corresponding second coupler or combiner 702B and the ITL 704.

The components of the interleaver and PLC based colorless add architecture 700 may be configured similar to the corresponding components above and the interleaver and PLC based colorless add architecture 700 may have similar advantages as the interleaver and PLC based colorless add architecture 600. The interleaver and PLC based colorless add architecture 700 may also have more design flexibility. For instance, in different embodiments, more than two PLCs 705, each comprising even and odd first couplers 702A, may be coupled to the two second couplers or combiners 702B, e.g., to increase the number of channels. For instance, each of the second couplers or combiners 702B may be coupled to three or more odd or even first couplers 702A in three or more corresponding PLCs 705. The interleaver based colorless add architecture 700 may receive about N (e.g., 20) wavelength channels via N switches 701 per PLC 705, and provide 2N (e.g., 20 even and 20 odd) wavelength channels (via the ITL 604) per PLC 705. In the case of 20 input channels, the insertion loss at the N switches 701 per PLC 705 may be less than or equal to about 2 dB, and the insertion loss at the two even and odd first couplers 702A may be about 15 dB. The insertion loss at the two second couplers or combiners 702B may be about 4 dB.

Figure 8:
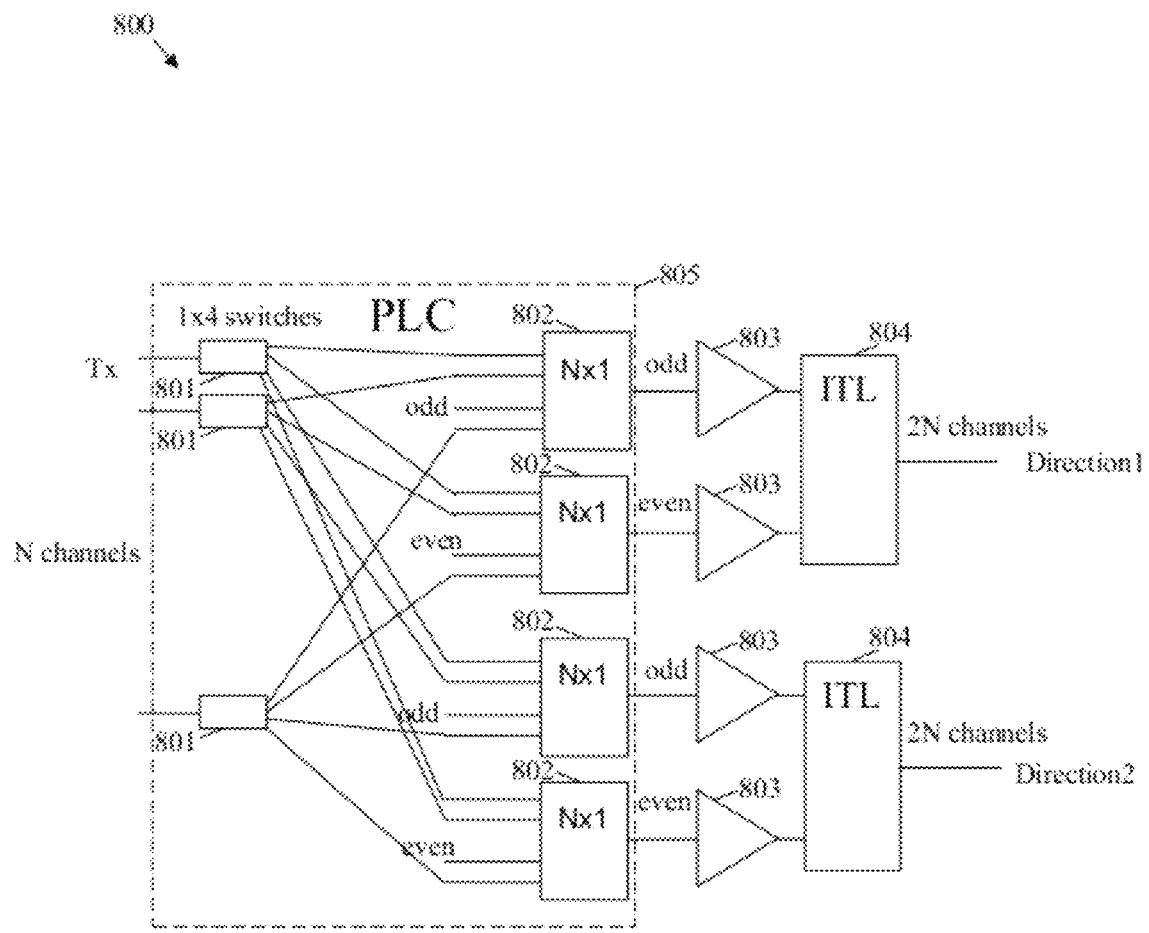
FIG. 8 is a schematic diagram of another embodiment of an interleaver and PLC based colorless add architecture.

FIG. 8 illustrates an embodiment of another interleaver and PLC based colorless add architecture 800 that may be used in WDM or DWDM based communications systems. The interleaver and PLC based colorless add architecture 800 may comprise a plurality of switches 801, about four couplers 802, about two ITLs 804, and possibly about four amplifiers 803, which may be arranged as shown in FIG. 8. The components of interleaver and PLC based colorless add architecture 800 may be configured similar to the components described above. Thus, the system may have the same advantages as the interleaver and PLC based colorless add architecture 600.

Specifically, 2N switches 801 and the four couplers 802 may be integrated or positioned on a PLC 805 (e.g., on a board or card). Each of the switches 801 (4×1 switches) may be coupled to each of the four couplers 802, which may comprise about two odd channel couplers 802 and about two even channel couplers 802. A first pair of even and odd channel couplers 802 may be coupled to one of the ITLs 804 and a second pair of even and odd channel couplers 802 may be coupled to a second ITL 804. Each ITL 804 may provide about 2N channels, e.g., N even channels and N odd channels. The interleaver and PLC based colorless add architecture 800 may be directionless where each ITL 804 may provide 2N channels, which may be similar, in two different (e.g., upstream and downstream) directions.

Figure 9:
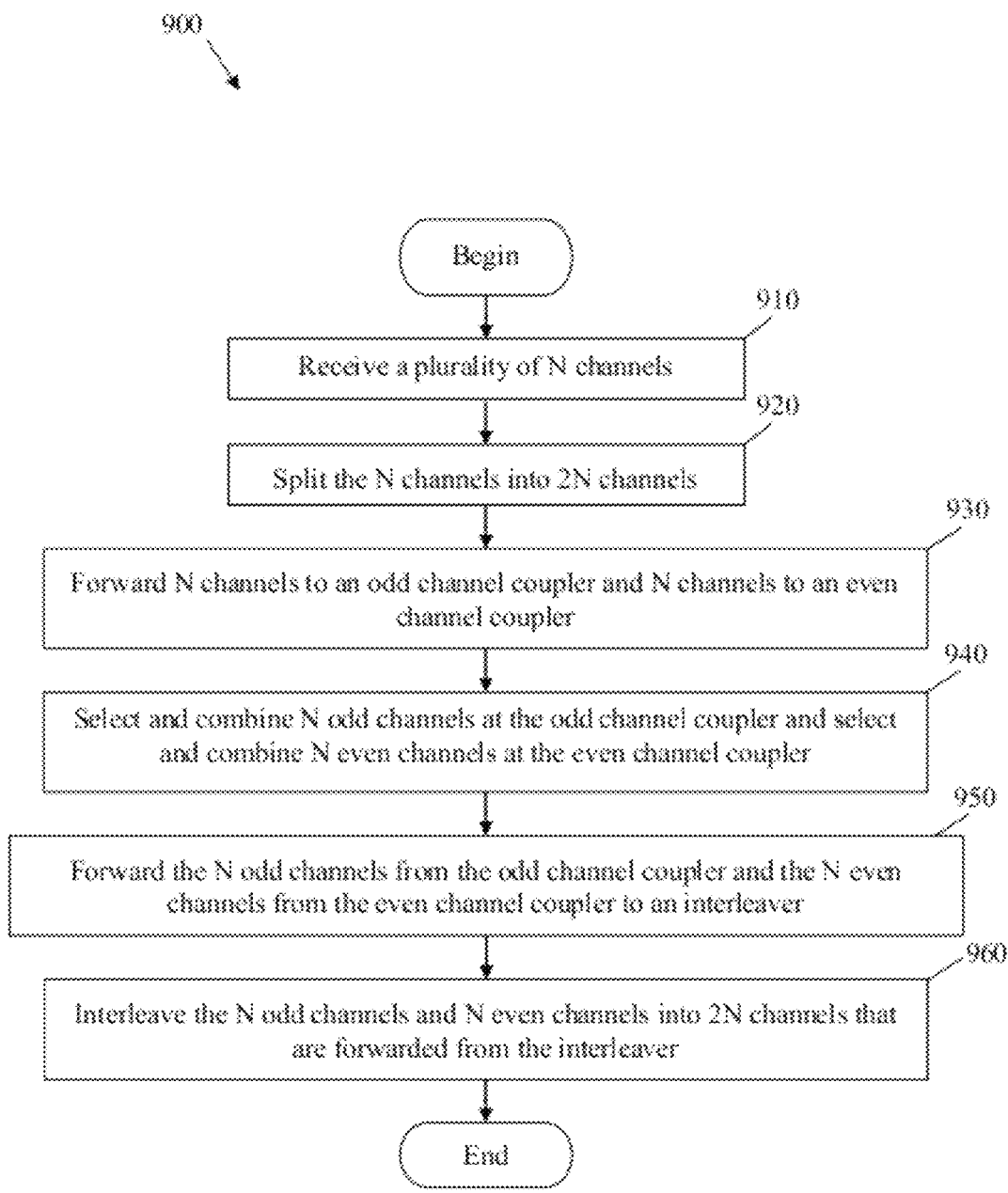
FIG. 9 is a flowchart of an embodiment of an interleaver based colorless add method.

FIG. 9 illustrates an embodiment of an interleaver based colorless add method 900, which may be implemented using any of the interleaver based colorless add architectures or any of the interleaver and PLC based colorless add architectures above. The interleaver based colorless add method 900 may begin at block 910, where a plurality of N channels may be received. The N channels may be received from a plurality of N corresponding colorless laser transmitters by a plurality of N switches. At block 920, the N channels may be split into 2N channels. Each of the N switches may switch one of the N channels into two similar channels. At block 930, N channels may be forwarded to an odd channel coupler and N channels may be forwarded to an even channel coupler. Each switch may forward one of the two similar channels to an even channel coupler and to an odd channel coupler. At block 940, N odd channels may be selected and combined from the odd channel coupler and N even channels may be selected and combined from the even channel coupler. At block 950, the N odd channels from the odd channel coupler and the N even channels from the even channel coupler may be forwarded to an interleaver. At block 960, the N odd channels and the N even channels may be interleaved into 2N channels that are forwarded from the interleaver. The method 900 may then end.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a plurality of first switches coupled to a plurality of first colorless laser transmitters;
   a first odd channel coupler coupled to each of the first switches;
   a first even channel coupler coupled to each of the first switches;
   a plurality of second switches coupled to a plurality of second colorless laser transmitters;
   a second odd channel coupler coupled to each of the second switches;
   a second even channel coupler coupled to each of the second switches;
   a first odd channel combiner coupled to the first odd channel coupler and the second odd channel coupler;
   a first even channel combiner coupled to the first even channel coupler and the second even channel coupler; and
   a first interleaver coupled to the first odd channel combiner and the first even channel combiner.

2. The apparatus of claim 1 further comprising:
   a first amplifier positioned between the first odd channel coupler and the first interleaver; and
   a second amplifier positioned between the first even channel coupler and the first interleaver.

3. The apparatus of claim 2, wherein the first amplifier and the second amplifier are Erbium Doped Fiber Amplifier (EDFA) amplifiers.

4. The apparatus of claim 1, wherein the first switches, the first odd channel coupler, and the first even channel coupler are integrated onto a planar-lightwave circuit (PLC).

5. The apparatus of claim 1, wherein the first switches receive an integer N of channels, the second switches receive an integer N of channels, and the first interleaver provides 2N channels.

6. The apparatus of claim 1 further comprising:
   a first amplifier positioned between the first odd channel combiner and the first interleaver; and
   a second amplifier positioned between the first even channel combiner and the first interleaver.

7. The apparatus of claim 1, wherein the first switches, the first odd channel coupler, and the first even channel coupler are integrated onto a first planar-lightwave circuit (PLC), and wherein the second switches, the second odd channel coupler, and the second even channel coupler are integrated onto a second PLC.

8. The apparatus of claim 1 further comprising:
   a third odd channel coupler coupled to each of the first switches;
   a third even channel coupler coupled to each of the first switches;
   a fourth odd channel coupler coupled to each of the second switches;
   a fourth even channel coupler coupled to each of the second switches;
   a second odd channel combiner coupled to the third odd channel coupler and the fourth odd channel coupler;
   a second even channel combiner coupled to the third even channel coupler and the fourth even channel coupler; and
   a second interleaver coupled to the second odd channel combiner and the second even channel combiner.

9. The apparatus of claim 8 further comprising:
   a first amplifier positioned between the first odd channel combiner and the first interleaver;
   a second amplifier positioned between the first even channel combiner and the first interleaver;
   a third amplifier positioned between the second odd channel combiner and the second interleaver; and
   a fourth amplifier positioned between the second even channel combiner and the second interleaver.

10. The apparatus of claim 8, wherein the first switches, the first odd channel coupler, the first even channel coupler, the third odd channel coupler, and the third even channel coupler are integrated onto a first planar-lightwave circuit (PLC), and wherein the second switches, the second odd channel coupler, the second even channel coupler, the fourth odd channel coupler, and the fourth even channel coupler are integrated onto a second PLC.

11. The apparatus of claim 8, wherein the first switches receive an integer N of channels, the second switches receive an integer N of channels, the first interleaver provides 2N channels in a first transmission direction, and the second interleaver provides 2N channels in a second transmission direction.

12. An apparatus comprising:
   a first odd channel coupler coupled to a plurality of first laser transmitters;
   a first even channel coupler coupled to a plurality of second laser transmitters;
   a second odd channel coupler coupled to a plurality of third laser transmitters;
   a second even channel coupler coupled to a plurality of fourth laser transmitters;
   an odd channel combiner coupled to the first odd channel coupler and the second odd channel coupler;
   an even channel combiner coupled to the first even channel coupler and the second even channel coupler; and
   an interleaver coupled to the odd channel combiner and the even channel combiner.

13. The apparatus of claim 12, wherein the first odd channel coupler receives an integer N of first odd channels, the first even channel coupler receives an integer N of first even channels, the second odd channel coupler receives an integer N of second odd channels, the second even channel coupler receives an integer N of second even channels, the odd channel combiner combines the first N odd channels from the first odd channel coupler and the second N odd channels from the second odd channel coupler, the even channel combiner combines the first N even channels from the first even channel coupler and the second N even channels from the second even channel coupler, and the interleaver combines 2N odd channels from the odd channel combiner and 2N even channels from the even channel combiner and provides 4N channels.

14. An apparatus comprising:
- a plurality of first switches coupled to a plurality of first colorless laser transmitters;
- a first odd channel coupler coupled to each of the first switches;
- a first even channel coupler coupled to each of the first switches;
- a plurality of second switches coupled to a plurality of second colorless laser transmitters;
- a second odd channel coupler coupled to each of the second switches;
- a second even channel coupler coupled to each of the second switches;
- an odd channel combiner coupled to the first odd channel coupler and the second odd channel coupler;
- an even channel combiner coupled to the first even channel coupler and the second even channel coupler; and
- a wavelength selective switch (WSS) coupled to the odd channel combiner and the even channel combiner.

15. The apparatus of claim 14 further comprising:
- a first amplifier positioned between the odd channel combiner and the WSS; and
- a second amplifier positioned between the even channel combiner and the WSS.

16. The apparatus of claim 14, wherein the switches, the odd channel coupler, and the even channel coupler are integrated onto a first planar-lightwave circuit (PLC), and wherein the second switches, the second odd channel coupler, and the second even channel coupler are integrated onto a second PLC.

17. A method implemented using an colorless add apparatus comprising:
- combining an integer N of first odd channels at a first odd channel coupler;
- combining an integer N of first even channels at a first even channel coupler;
- combining an integer N of second odd channels at a second odd channel coupler;
- combining an integer N of second even channels at a second even channel coupler;
- forwarding the first N odd channels from the first odd channel coupler to an odd channel combiner;
- forwarding the first N even channels from the first even channel coupler to an even channel combiner;
- forwarding the second N odd channels from the second odd channel coupler to the odd channel combiner;
- forwarding the second N even channels from the second even channel coupler to the even channel combiner;
- combining 2N odd channels at the odd channel combiner;
- combining 2N even channels at the even channel combiner;
- forwarding the 2N odd channels from the odd channel combiner to an interleaver;
- forwarding the 2N even channels from the even channel combiner to the interleaver;
- interleaving the 2N odd channels and the 2N even channels at the interleaver into 4N channels; and
- forwarding the 4N channels.

* * * * *

UNITED STATES PATENT AND TRADEMARK OFFICE
CERTIFICATE OF CORRECTION

PATENT NO. : 8,842,947 B2  
APPLICATION NO. : 13/292564  
DATED : September 23, 2014  
INVENTOR(S) : Zhiping Jiang, Jian Zhong and Yan Cui It is certified that error appears in the above-identified patent and that said Letters Patent is hereby corrected as shown below:

In the Claims,

Column 12, Line 7, Claim 17 should read:

A method implemented using a colorless add apparatus comprising:
combining an integer N of first odd channels at a first odd channel coupler;
combining an integer N of first even channels at a first even channel coupler;
combining an integer N of second odd channels at a second odd channel coupler;
combining an integer N of second even channels at a second even channel coupler;
forwarding the first N odd channels from the first odd channel coupler to an odd channel combiner;
forwarding the first N even channels from the first even channel coupler to an even channel combiner;
forwarding the second N odd channels from the second odd channel coupler to the odd channel combiner;
forwarding the second N even channels from the second even channel coupler to the even channel combiner;
combining 2N odd channels at the odd channel combiner;
combining 2N even channels at the even channel combiner;
forwarding the 2N odd channels from the odd channel combiner to an interleaver;
forwarding the 2N even channels from the even channel combiner to the interleaver;
interleaving the 2N odd channels and the 2N even channels at the interleaver into 4N channels; and
forwarding the 4N channels.

Signed and Sealed this  
Sixth Day of January, 2015

Michelle K. Lee  
*Deputy Director of the United States Patent and Trademark Office*